United States Patent
Sakaguchi et al.

(10) Patent No.: US 9,246,414 B2
(45) Date of Patent: Jan. 26, 2016

(54) PIEZOELECTRIC POWER GENERATOR

(71) Applicant: MURATA MANUFACTURING CO., LTD., Nagaokakyo-Shi, Kyoto-fu (JP)

(72) Inventors: Hitoshi Sakaguchi, Nagaokakyo (JP); Chikahiro Horiguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 294 days.

(21) Appl. No.: 13/963,068

(22) Filed: Aug. 9, 2013

(65) Prior Publication Data

US 2013/0320807 A1    Dec. 5, 2013

Related U.S. Application Data

(63) Continuation of application No. PCT/JP2012/058799, filed on Apr. 2, 2012.

(30) Foreign Application Priority Data

Apr. 7, 2011 (JP) .................................. 2011-084967

(51) Int. Cl.
*H02N 2/18* (2006.01)

(52) U.S. Cl.
CPC ..................................... *H02N 2/188* (2013.01)

(58) Field of Classification Search
CPC .............. H01L 41/113; H01L 41/1134; H01L 41/1136; H01L 41/1138
USPC ........................................................ 310/339
See application file for complete search history.

(56) References Cited

U.S. PATENT DOCUMENTS

| | | | |
|---|---|---|---|
| 7,948,153 B1* | 5/2011 | Kellogg et al. | 310/339 |
| 2007/0145861 A1* | 6/2007 | Tanner | 310/339 |
| 2010/0207491 A1 | 8/2010 | Gammaitoni et al. | |
| 2012/0068576 A1* | 3/2012 | Lee | 310/339 |

FOREIGN PATENT DOCUMENTS

| | | |
|---|---|---|
| JP | 7-245970 A | 9/1995 |
| JP | 11-146663 A | 5/1999 |
| JP | 3170965 B2 | 5/2001 |
| JP | 2001-231272 A | 8/2001 |
| JP | 2001-275370 A | 10/2001 |
| JP | 2006-294947 A | 10/2006 |
| JP | 2009-247106 A | 10/2009 |
| JP | 2010-51945 A | 3/2010 |
| WO | WO-2010/020389 A2 | 2/2010 |
| WO | WO-2010/036089 A2 | 4/2010 |

OTHER PUBLICATIONS

International Search Report and Written Opinion for PCT/JP2012/058799, date of mailing Jul. 3, 2012.

* cited by examiner

*Primary Examiner* — Derek Rosenau
(74) *Attorney, Agent, or Firm* — Arent Fox LLP

(57) ABSTRACT

A piezoelectric power generator including a resonator having a first weight member supported on a base member by a spring; a second weight member; and a generating device having a vibrating plate with a piezoelectric element attached to a surface thereof. Further, the vibrating plate has one end secured to the first weight member and the other end being a free end attached to the second weight member. The generating device is capable of bending and vibrating in an up-and-down direction, such that the first weight member can swing at a predetermined frequency about an axis perpendicular to a bending vibration plane of the generating device.

19 Claims, 10 Drawing Sheets (a) FREQUENCY CHARACTERISTIC OF VOLTAGE AMPLIFICATION FACTOR (b) FREQUENCY CHARACTERISTIC OF POWER AMPLIFICATION FACTOR

*SPRING CONSTANT OF RESONATOR IS 0.12 N/mm
VERTICAL AXIS IS NORMALIZED TO EACH MAXIMUM DISPLACEMENT.

(a) VOLTAGE AMPLIFICATION FACTOR (b) POWER AMPLIFICATION FACTOR (c) GENERATOR-NORMALIZED FREQUENCY

PIEZOELECTRIC POWER GENERATOR

CROSS REFERENCE TO RELATED APPLICATIONS

The present application is a continuation of PCT/JP2012/058799 filed Apr. 2, 2012, which claims priority to Japanese Patent Application No. 2011-084967, filed Apr. 7, 2011, the entire contents of each of which are incorporated herein by reference.

FIELD OF THE INVENTION

The present invention relates to a piezoelectric power generator that generates electric power by converting mechanical energy to electrical energy using a piezoelectric effect.

BACKGROUND OF THE INVENTION

Conventionally, various piezoelectric power generators have been proposed which generate electric power using a piezoelectric effect. Patent Document 1 discloses a piezoelectric power generator having a cantilever structure such as that illustrated in FIG. 12. This piezoelectric power generator includes a generating device 52 and a weight 53. One end of the generating device 52 is secured to a frame-like supporting member 51, and the other end of the generating device 52 is a free end. The weight 53 is provided for excitation and is attached to the free end of the generating device 52. The generating device 52 has a unimorph structure in which a piezoelectric element 52b is bonded to one principal surface of a metal plate 52a. The entire generating device 52 is in the shape of a rectangular parallelepiped. When an external vibration acts on the piezoelectric power generator, a free vibration is excited in the generating device 52 by the action of the weight 53, and an electric charge can be generated by a piezoelectric effect of the piezoelectric element 52b. The generated electric charge is extracted from charge collecting electrodes formed on the front and back surfaces of the piezoelectric element 52b.

For example, like power generators that use vibration of human walk or vibration of bicycles or cars, there are power generators used in a relatively low-frequency vibration region. By bringing the natural frequency of a generating device close to the frequency of such a low-frequency external vibration, it is possible to significantly vibrate the generating device and increase the amount of power generation. The amount of power generation of a piezoelectric element is determined by a value obtained by dividing the product of the square of a piezoelectric constant of a piezoelectric body forming the piezoelectric element, the square of stress applied to the piezoelectric body, and a volume of the piezoelectric body by a dielectric constant of the piezoelectric body. If the material of the piezoelectric body is the same, the amount of power generation W is proportional to the product of the square of stress σ applied to the piezoelectric body and a volume V of the piezoelectric body as given by the expression $W \propto \sigma^2 \times V$.

Therefore, to increase the amount of power generation W, it is effective to increase both the stress σ applied to the piezoelectric body and the volume V of the piezoelectric body. In particular, the stress σ has a greater influence on the amount of power generation W than the volume V does. To increase the stress σ applied to the piezoelectric body, it is effective to increase the amount of displacement of the generating device. However, the amount of displacement of the generating device cannot be significantly increased simply by supporting the generating device 52 with the supporting member 51 in a cantilever manner.

Patent Document 2 discloses a piezoelectric power generator in which a plurality of generating devices having different resonance frequencies are supported in a cantilever manner. As illustrated in FIG. 13, this piezoelectric power generator includes a plurality of generating devices 61 to 63 each having one end secured to a base 60 and the other end being a free end, and weights 64 to 66 provided for excitation and attached to the respective free ends of the generating devices 61 to 63. The generating devices 61 to 63 have different lengths. This piezoelectric power generator is designed to generate electric power in a wide frequency range even when the frequency of external vibration varies. However, it is not possible to increase the amount of power generation at a specific frequency.

Patent Document 3 discloses another piezoelectric power generator. As illustrated in FIG. 14, this piezoelectric power generator includes a lever 71 having a cantilever structure in which one end thereof is secured to a metal angle 70 and the other end thereof is a free end, a weight 72 attached to the free end of the lever 71, and a multilayer piezoelectric element 73 connected to a midpoint (point of action) of the lever 71. This piezoelectric power generator amplifies an external force using the principle of leverage to increase the force applied to the multilayer piezoelectric element 73. However, since only a compressive load in the thickness direction acts on the multilayer piezoelectric element 73, the amount of distortion of the piezoelectric element is not large enough to significantly increase the amount of power generation.

Patent Document 1: Japanese Patent No. 3170965
Patent Document 2: Japanese Unexamined Patent Application Publication No. 7-245970
Patent Document 3: Japanese Unexamined Patent Application Publication No. 11-146663

SUMMARY OF THE INVENTION

An object of the present invention is to propose a piezoelectric power generator that amplifies a displacement of a generating device and generates a large amount of electric power.

To achieve the object described above, the present invention provides a piezoelectric power generator that includes a resonator including a first weight member supported on a base member via a spring means; a second weight member; and a generating device including a vibrating plate having a piezoelectric element bonded to a principal surface thereof, the vibrating plate having one end secured to the first weight member and the other end being a free end to which the second weight member is attached, the generating device being capable of bending and vibrating in an up-and-down direction. The first weight member swings at a predetermined frequency about an axis perpendicular to a bending vibration plane of the generating device. The first weight member preferably swings in accordance with an external vibration applied to the base member, and the generating device preferably bends and vibrates in synchronization with the swing of the first weight member.

A feature of the present invention is that an external vibration applied to the base member is not directly transmitted to the generating device, and energy of the external vibration is amplified by the resonator and transmitted to the generating device. In particular, the resonator converts an up-and-down external vibration to a swing motion about an axis perpendicular to the bending vibration plane of the generating device, so as to swing the first weight member. When the second weight member moves up and down in synchronization with the swing of the first weight member, it is possible to amplify the bending vibration of the generating device and cause the generating device to bend and vibrate more significantly than in the case where the generating device is directly secured to the base member. This increases bending stress applied to the generating device and increases the amount of power generation.

A mass of the first weight member is preferably greater than a mass of the second weight member. When a mass of the first weight member is greater than a mass of the second weight member, since the first weight member has kinetic energy greater than that of the second weight member, the kinetic energy of the first weight member can be effectively supplied to the bending vibration of the generating device. This makes it possible to further amplify the amount of displacement of the generating device.

A swing axis of the first weight member may be set to be closer to the free end side of the generating device than the center of gravity of the first weight member is. The swing axis of the first weight member may be closer to either the fixed end side or the free end side of the generating device than the center of gravity of the first weight member is. However, when the swing axis of the first weight member is closer to the free end side of the generating device, an angular change occurs simultaneously with the up-and-down change in position of the first weight member that supports the one end of the generating device. Under the synergistic action of the angular change and the up-and-down displacement at the fixed end of the generating device, the amount of displacement of the generating device further increases. This means that the amount of power generation increases.

A resonance frequency of the resonator is preferably lower than a resonance frequency of the generating device including the second weight member. The present inventors examined the piezoelectric power generator which combines the resonator with the generating device, and found that when the resonance frequency of the resonator was lower than that of the generating device, the voltage amplification factor and the power amplification factor were higher than those in the case where the two resonance systems, the resonator and the generating device, had the same resonance frequency. Thus, by appropriately setting the spring constant of the spring means of the resonator and the masses of the first weight member and the second weight member, it is possible to amplify the bending displacement of the generating device and increase the amount of power generation.

The ratio of a resonance frequency f1 of the resonator in the first-order mode to a resonance frequency fa of the generating device including the second weight member preferably satisfies $0.4 \leq f1/fa \leq 0.95$. The resonator has a plurality of resonant modes, from the first to higher order modes, depending on the configuration of the spring means. A resonance frequency in the first-order mode refers to the lowest of resonance frequencies of the resonator. Vibrational energy in the first-order mode is greater that in higher order modes. As described above, when the resonance frequency of the resonator in the first-order mode is lower than the resonance frequency of the generating device, the voltage amplification factor and the power amplification factor are higher. It is most effective particularly when the frequency ratio f1/fa is in the range of 0.4 to 0.95. If the frequency ratio f1/fa is less than 0.4, the spring constant of the spring means is too low and, due to the lack of restoring force, the voltage amplification factor and the power amplification factor tend to be lower than those when the frequency ratio f1/fa is in the range described above. If the frequency ratio f1/fa is greater than 0.95, the spring constant of the spring means is too high and, because the swing of the first weight member is reduced, the voltage amplification factor and the power amplification factor tend to be lower than those when the frequency ratio f1/fa is in the range described above.

The spring means of the resonator may include a plurality of coil springs. Using a plurality of coil springs, which have good linearity, makes it possible to vibrate the first weight member in a mode for swinging about a horizontal axis.

As described above, in the present invention, the resonator converts an external vibration to a swing motion about an axis perpendicular to the bending vibration plane of the generating device, and the second weight member moves up and down in synchronization with the swing of the first weight member. Since this amplifies the bending vibration of the generating device, the generating device can bend and vibrate more significantly than in the case where the generating device is directly secured to the base member. It is thus possible to increase the amount of power generation.

DETAILED DESCRIPTION OF THE PREFERRED EMBODIMENTS OF THE INVENTION

Figure 1:
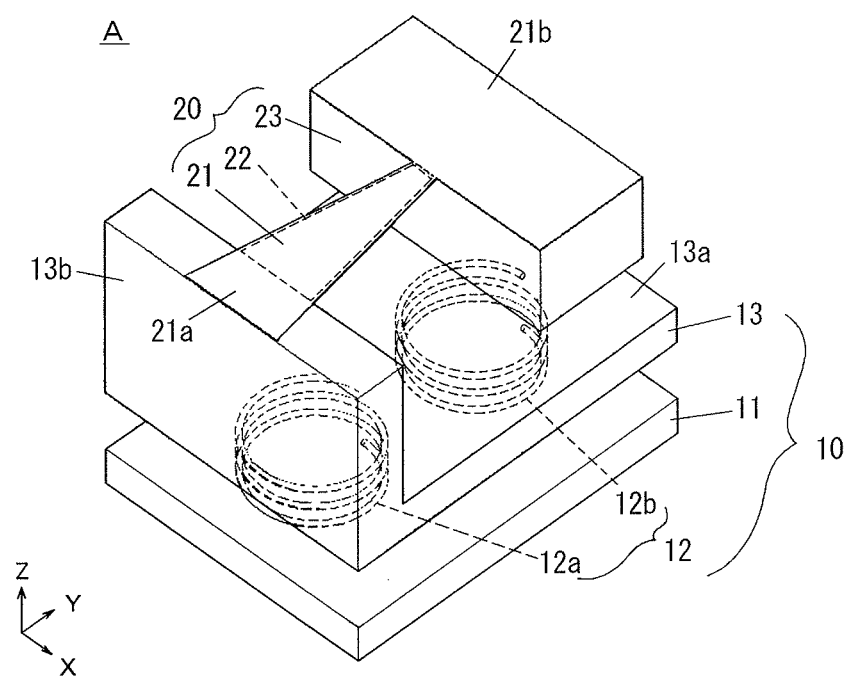
FIG. 1 is a perspective view of a first embodiment of a piezoelectric power generator according to the present invention.
Figure 2:
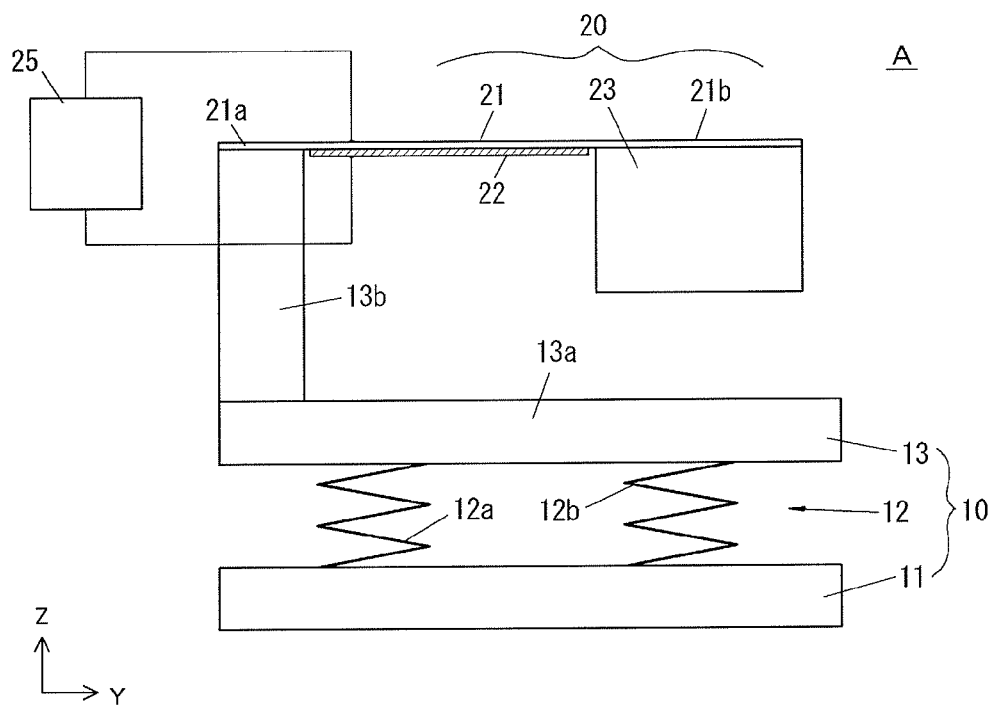
FIG. 2 is a lateral view of the piezoelectric power generator illustrated in FIG. 1, the lateral view illustrating the piezoelectric power generator at a standstill.

FIGS. 1 and 2 illustrate a first embodiment of a piezoelectric power generator according to the present invention. A piezoelectric power generator A of the present embodiment includes a resonator 10 and a cantilever-type generating device 20.

The resonator 10 includes a base member 11, a spring means 12, and a first weight member 13 elastically supported on the base member 11 via the spring means 12. Although the base member 11 of the present embodiment is a flat plate-like member, the base member 11 may be part of a case or the like, and may be of any shape as long as it can receive an external vibration. The first weight member 13 of the present embodiment is L-shaped in lateral view, and is composed of a flat support plate portion 13a and a support base portion 13b standing at a back end of the support plate portion 13a. The first weight member 13 is formed by a rigid mass body, such as a metal body. The first weight member 13 is a swinging weight member having the function of swinging the generating device 20. The spring means 12 includes two coil springs 12a and 12b interposed between the base member 11 and the support plate portion 13a of the first weight member 13. The coil springs 12a and 12b of the present embodiment have the same spring constant, but they may have different spring constants. The coil springs 12a and 12b are disposed directly below the generating device 20, and spaced apart in the length direction (Y-axis direction). For example, the coil springs 12a and 12b are each formed by a coil spring having a spring constant of 0.04 N/mm to 0.50 N/mm.

The generating device 20 includes a vibrating plate 21, such as a metal plate, and a piezoelectric element 22 bonded to either one or both principal surfaces of the vibrating plate 21. The vibrating plate 21 extends along the support plate portion 13a. One end 21a of the vibrating plate 21 is secured to the upper surface of the support base portion 13b of the first weight member 13, whereas the other end of the vibrating plate 21 is a free end. The other end of the vibrating plate 21 forms a weight mounting portion 21b having a wide shape. A second weight member 23 is attached to the lower surface of the weight mounting portion 21b of the vibrating plate 21. Like the first weight member 13 described above, the second weight member 23 is formed by a mass body, such as a metal body. The second weight member 23 is a weight member for amplifying the amount of displacement, the weight member having the function of increasing the amount of displacement of the generating device 20. Thus, the generating device 20 is capable of bending and vibrating in the up-and-down direction. In the present embodiment, the width direction of the generating device 20 is defined an X-axis direction, the length direction of the generating device 20 is defined as a Y-axis direction, and the thickness direction (up-and-down direction) of the generating device 20 is defined as a Z-axis direction. In this case, a bending vibration plane of the generating device 20 is a Y-Z axial plane.

In the present embodiment, as viewed from above the piezoelectric power generator A, the vibrating plate 21 and the piezoelectric element 22 of the generating device 20 are in the shape of an isosceles triangle that gradually narrows from the one end 21a toward the other end of the vibrating plate 21, but they may be in the shape of a rectangle having a constant width or may be of any shape. The generating device 20 has a unimorph structure in which the piezoelectric element 22 made of piezoelectric ceramics or the like is bonded to one principal surface of the vibrating plate 21. For example, the metal plate 21 has a thickness of 75 μm and is made of 42 Ni, and the piezoelectric element 22 has a thickness of 75 μm and is made of PZT piezoelectric ceramics. Although the generating device 20 of the present embodiment has a unimorph structure, the generating device 20 may have a bimorph structure in which the piezoelectric element 22 is bonded to both principal surfaces of the vibrating plate 21. The position for bonding the piezoelectric element 22 is not limited to a region outside the one end 21a of the vibrating plate 21 secured to the support base portion 13b as in the present embodiment, and may be a region including the one end 21a. When the piezoelectric element 22 is bonded to the lower principal surface of the vibrating plate 21, a compressive stress always acts on the piezoelectric element 22 because of the influence of gravity acting on the second weight member 23. Piezoelectric ceramics generally has a higher mechanical strength against compressive stress than against tensile stress. Therefore, by bonding the piezoelectric element 22 in a direction in which the compressive stress acts, it is possible to improve the durability of the piezoelectric element 22 made of piezoelectric ceramics. The piezoelectric element 22 may be made of any material that allows direct conversion of mechanical energy to electrical energy. Besides piezoelectric ceramics, an organic piezoelectric material or a dielectric polymer material may be used as the material of the piezoelectric element 22.

Charge collecting electrodes (not shown) are formed on both surfaces of the piezoelectric element 22, and the charge collecting electrode on one of the surfaces is electrically connected to the vibrating plate 21. The charge collecting electrodes on the piezoelectric element 22 are connected to a rectifier and electric storage circuit 25 (see FIG. 2). The rectifier and electric storage circuit 25 has the function of rectifying and smoothing the output from the piezoelectric element 22 and storing power. The rectifier and electric storage circuit, which is publicly known, is not described in detail here.

In the present embodiment, where the second weight member 23 is secured to the lower surface of the vibrating plate 21, the height dimension of the piezoelectric power generator A can be reduced. The second weight member 23 and the support plate portion 13a of the first weight member 13 have a space therebetween, so that even when the first weight member 13 is displaced maximally, the second weight member 23 and the support plate portion 13a of the first weight member 13 can be prevented from coming into contact with each other. A resonance frequency (first-order resonance point) of the generating device 20 can be changed by varying, for example, the Young's modulus, length, width, or thickness of the vibrating plate 21 or the mass of the second weight member 23. For example, the resonance frequency of the generating device 20 is designed to be 15 Hz on the assumption that the piezoelectric power generator A is mounted on someone's clothes or belongings, or on vehicles such as bicycles or cars.

The mass of the first weight member 13 is preferably greater than the mass of the second weight member 23. In the present embodiment, for example, the mass of the first weight member 13 is 24.0 g and the mass of the second weight member 23 is 10.2 g. When the mass of the first weight member 13 is greater than the mass of the second weight member 23, if an external vibration is applied to the base member 11, the first weight member 13 has kinetic energy greater than that of the second weight member 23, and the kinetic energy of the first weight member 13 can be effectively supplied to the generating device 20. This makes it possible to further amplify the amount of displacement of the generating device 20.

Figure 3:
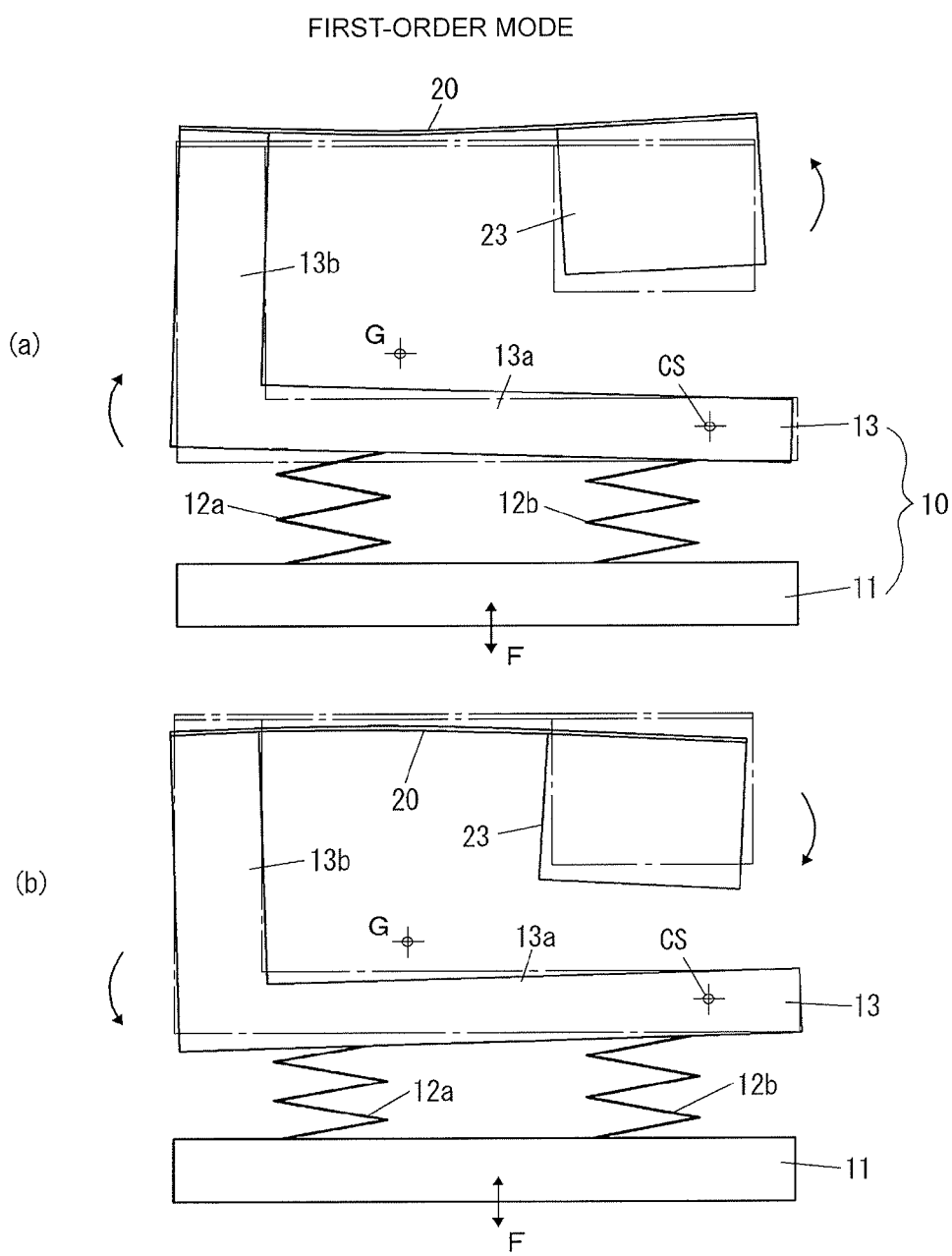
FIG. 3 is a lateral view of the piezoelectric power generator illustrated in FIG. 1, the lateral view illustrating a displacement of the piezoelectric power generator in the first-order mode.

FIG. 3 illustrates a displacement of the piezoelectric power generator A in the first-order mode of the resonator 10. The piezoelectric element 22 is omitted in FIG. 3. Solid lines represent a state of displacement, and dot-and-dash lines represent a state of standstill in FIG. 3. As illustrated, when an up-and-down external vibration F acts on the base member 11, the first weight member 13 is swung up and down by the spring means 12. The resonator 10 swings about a swing axis CS perpendicular to the bending vibration plane of the generating device 20. The swing axis CS is parallel to the X-axis. In the first-order mode, the swing axis CS of the first weight member 13 is closer to the free end side of the generating device 20 than the center of gravity G of the first weight member 13 is. That is, in the first-order mode, the swing axis CS is near the coil spring 12b. The coil spring 12b expands and contracts very little, whereas the coil spring 12a expands and contracts significantly. In synchronization with the swing of the first weight member 13, the generating device 20 bends and vibrates up and down. For example, when the first weight member 13 swings clockwise as illustrated in FIG. 3(a), the second weight member 23 is swung upward and the generating device 20 bends in a concave shape. On the other hand, when the first weight member 13 swings counterclockwise as illustrated in FIG. 3(b), the second weight member 23 is swung downward and the generating device 20 bends in a convex shape. Thus, when the one end 21a of the generating device 20 (the support base portion 13b of the first weight member 13), which is the fixed end, moves up and down, an angular change occurs at the same time and the amount of displacement of the generating device 20 is amplified. As a result, a stress applied to the piezoelectric element 22 of the generating device 20 is greater than that in the case where the generating device 20 is directly secured to the base member 11 and the amount of power generation is larger. Note that although FIG. 3 illustrates an example where the swing axis CS is located diagonally above the coil spring 12b, the location of the swing axis CS may change depending on the settings. It is only necessary that the swing axis CS be closer to the free end side of the generating device 20 than the center of gravity G of the first weight member 13 is.

Figure 4:
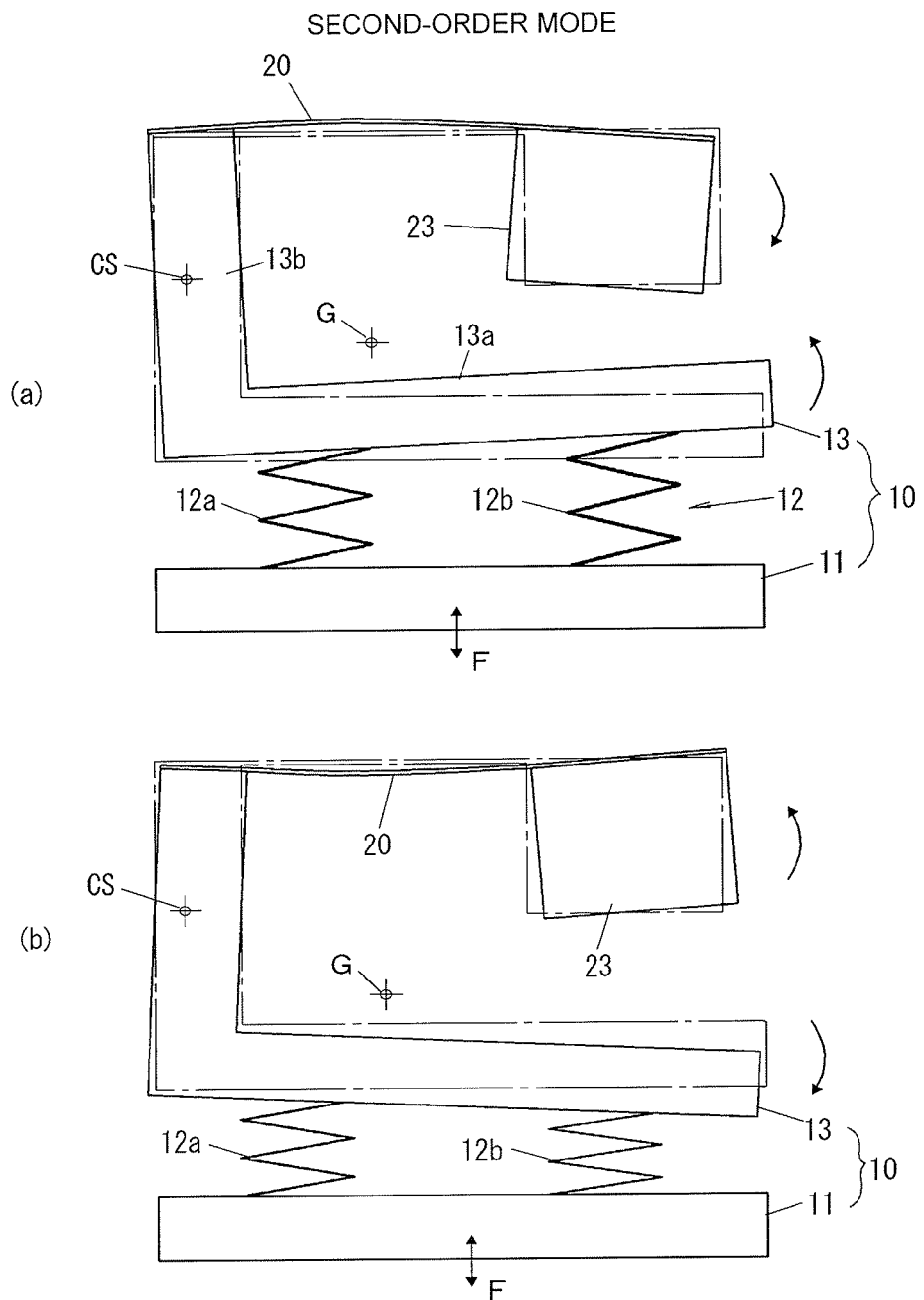
FIG. 4 is a lateral view of the piezoelectric power generator illustrated in FIG. 1, the lateral view illustrating a displacement of the piezoelectric power generator in the second-order mode.

FIG. 4 illustrates a displacement of the piezoelectric power generator A in the second-order mode of the resonator 10. The piezoelectric element 22 is omitted in FIG. 4. Solid lines represent a state of displacement, and dot-and-dash lines represent a state of standstill in FIG. 4. As illustrated, in the second-order mode, as in the first-order mode, when the up-and-down external vibration F acts on the base member 11, the first weight member 13 is swung up and down by the spring means 12. The resonator 10 swings about the swing axis CS perpendicular to the bending vibration plane of the generating device 20. The swing axis CS is parallel to the X-axis. In the second-order mode, the swing axis CS of the first weight member 13 is closer to the fixed end side of the generating device 20 than the center of gravity G of the first weight member 13 is. That is, in the second-order mode, the swing axis CS is near the center of the support base portion 13b of the first weight member 13. The amount of expansion and contraction of the coil spring 12b is greater than that of the coil spring 12a on the fixed end side of the generating device 20. In this mode, when the first weight member 13 swings counterclockwise as illustrated in FIG. 4(a), the second weight member 23 is displaced downward and the generating device 20 bends in a convex shape. On the other hand, when the first weight member 13 swings clockwise as illustrated in FIG. 4(b), the second weight member 23 is displaced upward and the generating device 20 bends in a concave shape. The amount of displacement of the generating device 20 in the second-order mode is smaller than that in the first-order mode, but is greater than that in the case where the generating device 20 is directly secured to the base member 11. Note that although FIG. 4 illustrates an example where the swing axis CS is located near the center of the support base portion 13b, the location of the swing axis CS may change depending on the settings. It is only necessary that the swing axis CS be closer to the fixed end side of the generating device 20 than the center of gravity G of the first weight member 13 is.

FIGS. 3 and 4 illustrate resonant modes that occur when the resonance frequency of the resonator 10 in the first-order mode is set to be lower than the resonance frequency of the generating device 20. Different resonant modes may occur if the resonance frequency of the resonator 10 in the first-order mode is set to be higher than the resonance frequency of the generating device 20 or if the configuration of the spring means 12 is changed. The resonance frequency of the resonator 10 in the first-order mode can be determined by the spring constant of the spring means 12 or the mass of the first weight member 13. The resonance frequency of the generating device 20 can be determined by the mass of the second weight member 23 or the spring constant of the vibrating plate 21.

Figure 5:
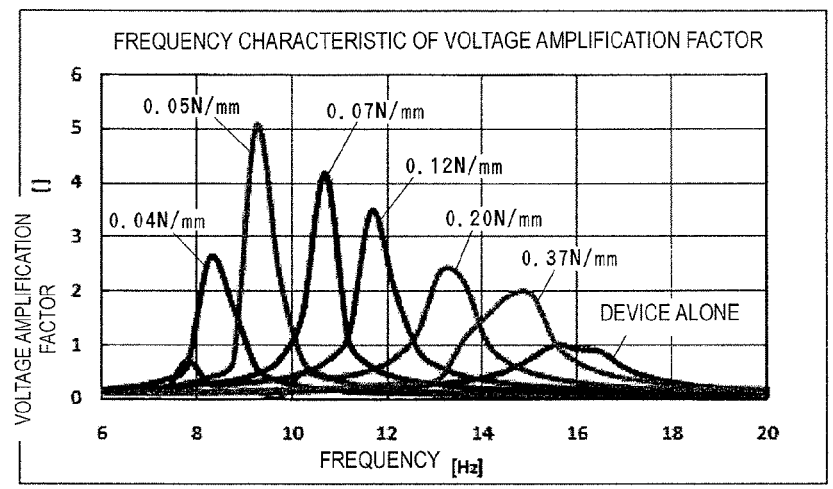
FIG. 5 illustrates frequency characteristics of a voltage amplification factor and a power amplification factor of the piezoelectric power generator obtained with different spring constants of coil springs of a resonator.
Figure 5:
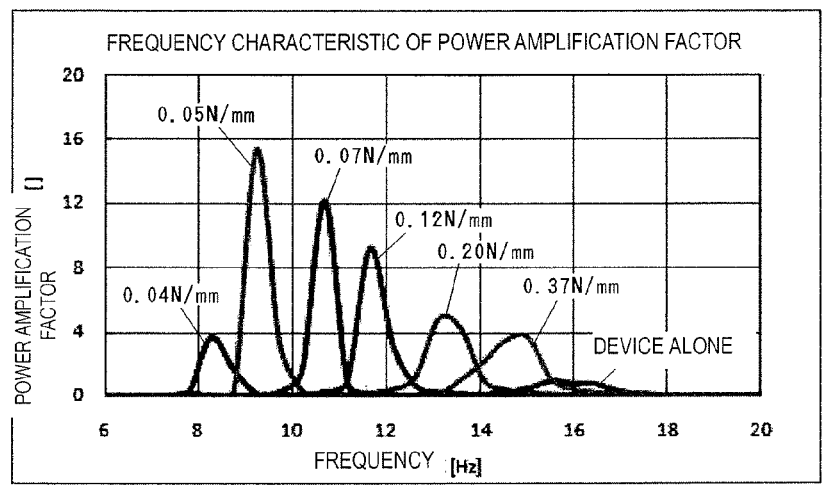

FIG. 5 illustrates frequency characteristics of a voltage amplification factor and a power amplification factor of the piezoelectric power generator A obtained with different spring constants of the coil springs 12a and 12b of the spring means 12 of the resonator 10. For comparison, a characteristic of the generating device 20 alone is also shown. The calculations were made on the assumption that the acceleration of input of an external vibration to the base member 11 was 100 mG, and that the generated voltage and power were voltage output and power consumed, with a matching resistor connected. In the case of FIG. 5, the first-order mode of the resonator 10 was used as a dominant mode.

In the case of the generating device 20 alone, voltage and power reach their peak values when the frequency of external vibration is about 15 Hz, which is the resonance frequency of the generating device. In the case of the piezoelectric power generator A which combines the resonator 10 with the generating device 20, as the spring constant decreases, frequencies corresponding to the peak values of the voltage amplification factor and the power amplification factor decrease and the peak values of the voltage amplification factor and the power amplification factor increase. This means that the resonance frequency of the piezoelectric power generator A increases in proportion to the spring constant. The voltage amplification factor and the power amplification factor reach their maximum values when the spring constant is 0.05 N/mm, and decrease dramatically when the spring constant becomes smaller than that. With the piezoelectric power generator A which combines the resonator 10 with the generating device 20, it is possible to provide a voltage amplification factor which is 1.9 to 5.1 times greater than that with the generating device 20 alone, and a power amplification factor which is 3.6 to 16.0 times greater than that with the generating device 20 alone.

The mechanism is that, under the same mass condition of the first weight member 13 of the resonator 10, as the spring constant of the coil springs 12a and 12b forming the spring means 12 decreases, the amount of deformation of the coil springs 12a and 12b increases and a larger amount of kinetic energy is stored in the coil springs 12a and 12b, and hence a larger amount of energy flows from the resonator 10 to the generating device 20. When the spring constant is too small, the voltage amplification factor and the power amplification factor decrease. This is because the coil springs 12a and 12b are too soft to ensure sufficient restoring force against deformation.

Figure 6:
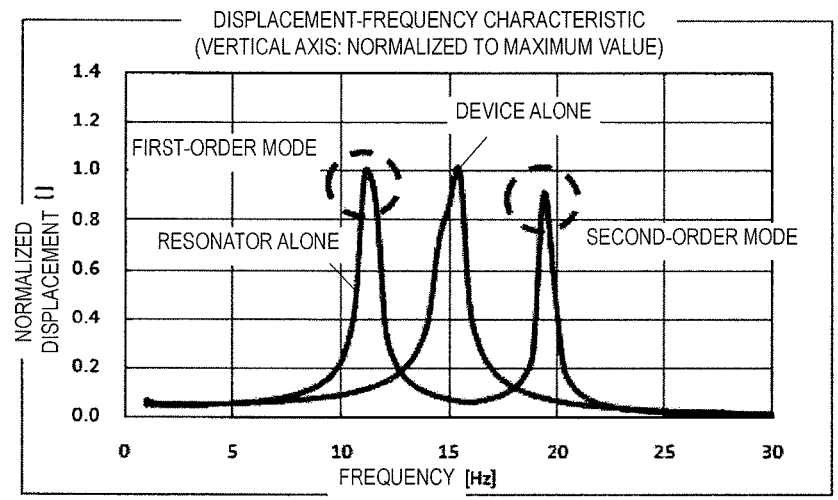
FIG. 6 illustrates displacement-frequency characteristics of the resonator alone and a generating device alone.

A description will now be given of a relationship between resonance frequencies of the resonator 10 and the generating device 20 necessary for power amplification. FIG. 6 illustrates displacement-frequency characteristics of the resonator 10 alone and the generating device 20 alone. For the resonator 10, the spring constant of the coil springs 12a and 12b is 0.12 N/mm. For the generating device 20 alone, there is a resonance point at about 15 Hz. As for the resonator 10, which uses two coil springs 12a and 12b, there are resonance points at about 11 Hz and about 20 Hz in the first-order mode and in the second-order mode, respectively. The dominant resonant mode of the piezoelectric power generator A is a mode obtained by coupling the resonance of the resonator 10 in the first-order mode to the resonance of the generating device 20. Therefore, a relationship between the resonance frequency of the resonator 10 in the first-order mode and the resonance frequency of the generating device 20 will be examined.

Figure 7:
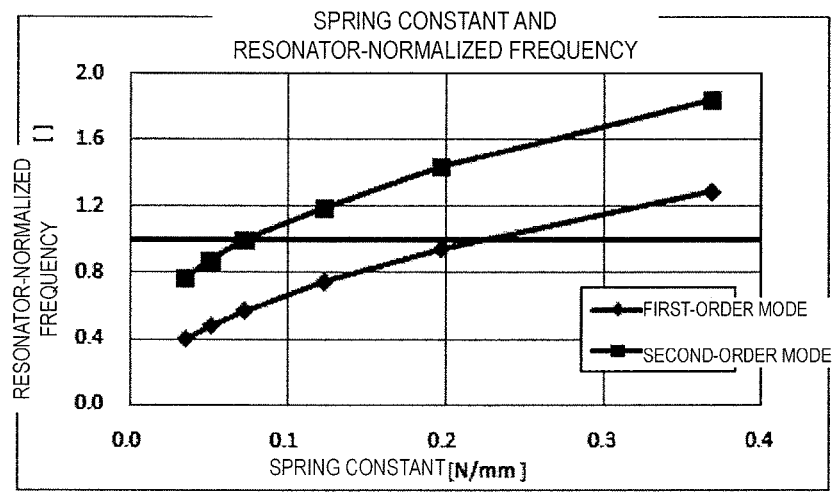
FIG. 7 illustrates a relationship between a spring constant and a resonator-normalized frequency.

FIG. 7 illustrates a relationship between a spring constant and resonator-normalized frequencies (i.e., a value obtained by normalizing the resonance frequency of the resonator 10 in the first-order mode to the resonance frequency of the generating device 20, and a value obtained by normalizing the resonance frequency of the resonator 10 in the second-order mode to the resonance frequency of the generating device 20). A line where the resonator-normalized frequency is 1.0 represents the resonance point (15 Hz) of the generating device 20. When the spring constant of the coil springs 12a and 12b is 0.23 N/mm or less, the resonator-normalized frequency in the first-order mode is 1.0 or less, and the resonance frequency of the resonator 10 in the first-order mode is lower than the resonance frequency of the generating device 20. When the spring constant of the coil springs 12a and 12b is 0.07 N/mm or less, the resonator-normalized frequency in the second-order mode is also 1.0 or less, and the resonance frequency of the resonator 10 in the second-order mode is lower than the resonance frequency of the generating device 20.

As is apparent from FIGS. 6 and 7, when the resonance frequency of the resonator 10 in the first-order mode is designed to be lower than the resonance frequency of the generating device 20, the voltage amplification factor and the power amplification factor are higher than those when the two resonance systems, the resonator 10 and the generating device 20, have the same resonance frequency. The definition of designing the resonance frequency to be lower, as described above, may be to design such that −3 dB widths (half-widths) of resonance frequency bands of the generating device 20 and the resonator 10 do not overlap with each other.

Figure 8:
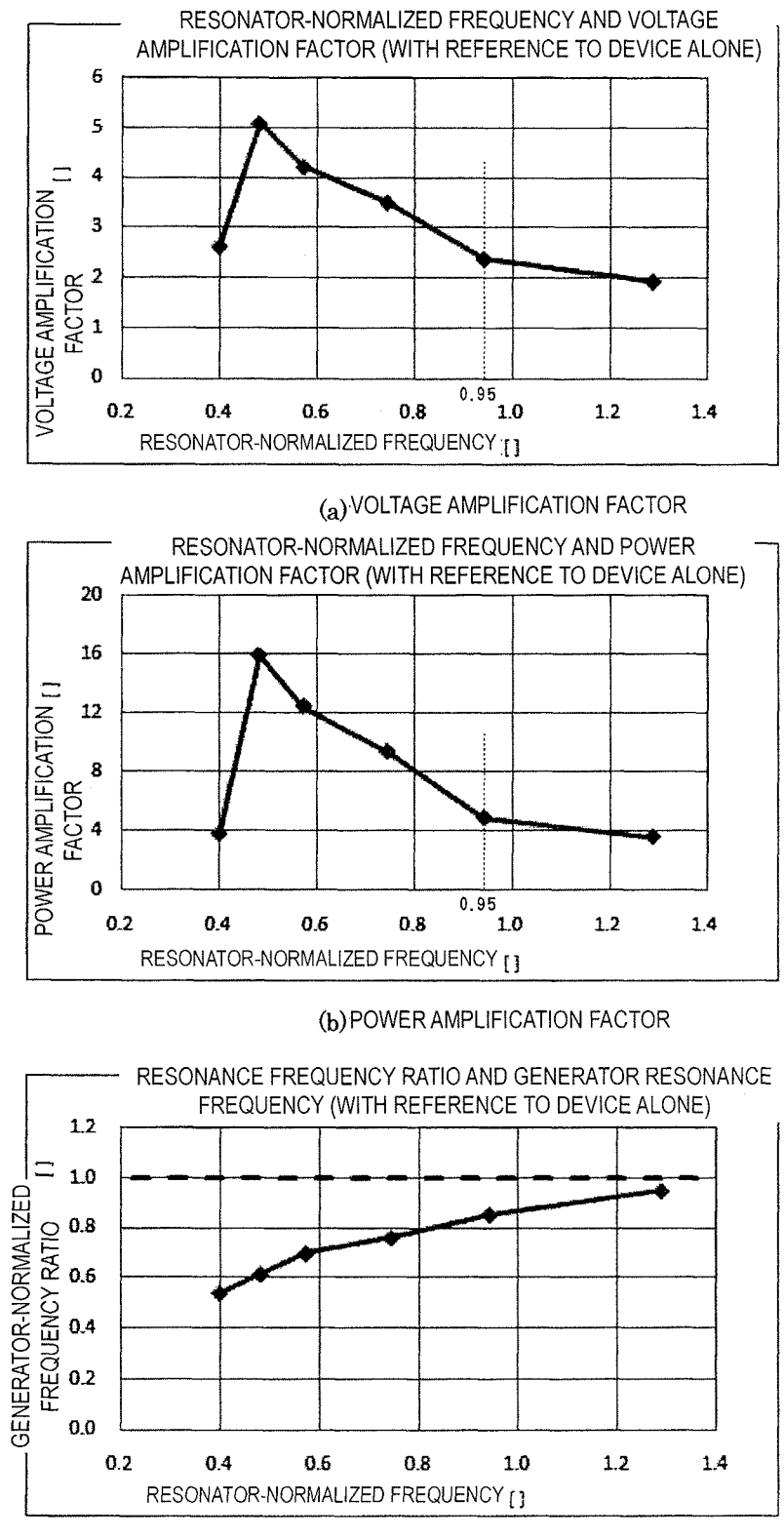
FIG. 8 illustrates a relationship between a resonator-normalized frequency and a voltage amplification factor, a relationship between a resonator-normalized frequency and a power amplification factor, and a relationship between a resonator-normalized frequency and a piezoelectric generator-normalized frequency.

FIG. 8(a) illustrates a relationship between a resonator-normalized frequency and a voltage amplification factor, FIG. 8(b) illustrates a relationship between a resonator-normalized frequency and a power amplification factor, and FIG. 8(c) illustrates a relationship between a resonator-normalized frequency and a piezoelectric generator-normalized frequency. In FIG. 8, a resonator-normalized frequency is a value (f1/fa) obtained by normalizing the resonance frequency of the resonator 10 in the first-order mode to the resonance frequency of the generating device 20, and a piezoelectric generator-normalized frequency is a value obtained by normalizing the resonance frequency of the piezoelectric power generator A to the resonance frequency of the generating device 20 alone.

As for the relationship between the voltage amplification factor and the power amplification factor, as illustrated in FIGS. 8(a) and 8(b), both the voltage amplification factor and the power amplification factor gradually decrease when the resonator-normalized frequency is 1 or more. When the resonator-normalized frequency is 1 or less, as the resonator-normalized frequency decreases, both the voltage amplification factor and the power amplification factor increase and reach their maximum values at about a resonator-normalized frequency of 0.5. When the resonance frequency of the resonator in the first-order mode is lower than the resonance frequency of the generating device 20, the voltage and the power are amplified more effectively than when the resonator 10 and the generating device 20 have the same resonance frequency. The maximum amplification effect is achieved when the resonator 10 is designed such that the resonator-normalized frequency is in the range of 0.40 to 0.95. The voltage amplification factor and the power amplification factor tend to decrease when the resonator-normalized frequency is less than 0.4. This is because the coil springs 12a and 12b forming the spring means 12 are too soft to ensure sufficient restoring force against deformation.

Referring to FIG. 8(c), the resonator-normalized frequency and the piezoelectric generator-normalized frequency are substantially proportional when the resonator-normalized frequency is less than 0.6. As the resonator-normalized frequency increases, the slope decreases and the piezoelectric generator-normalized frequency gradually approaches 1. Hence, by increasing the spring constant of the coil springs 12a and 12b forming the spring means 12, the vibration of the resonator 10 decreases and the resonance frequency of the piezoelectric power generator becomes closer to the resonance frequency of the generating device 20. Thus, with the structure of a piezoelectric power generator which combines a resonator with a generating device as in the present invention, it is possible to adjust the resonance frequency of the piezoelectric power generator by adjusting the spring constant of spring means of the resonator without changing the resonance frequency of the generating device.

(Second Embodiment)

Figure 9:
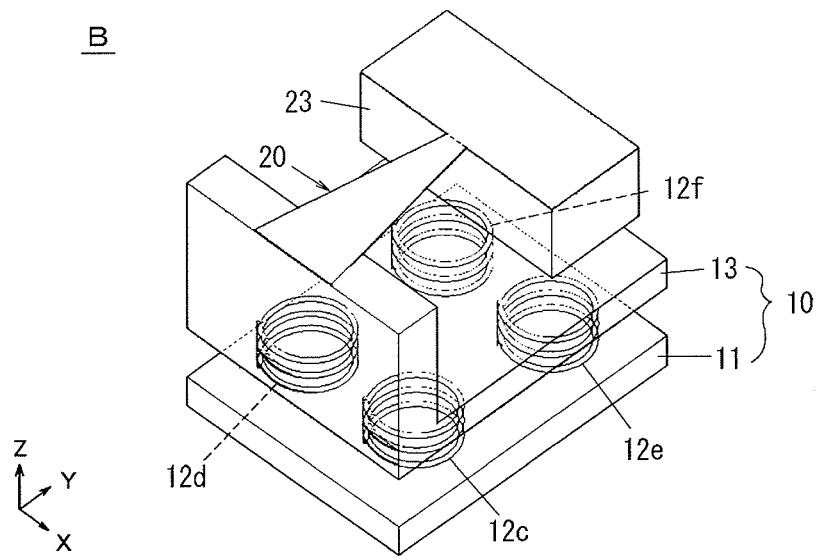
FIG. 9 is a perspective view of a second embodiment of the piezoelectric power generator according to the present invention.

FIG. 9 illustrates a second embodiment of the piezoelectric power generator according to the present invention. A piezoelectric power generator B of the present embodiment uses four coil springs 12c to 12f as the spring means 12. The coil springs 12c to 12f are spaced in the X-direction on both sides of the generating device 20, and are also spaced in the Y-direction. The piezoelectric power generator B of the present embodiment is the same as the piezoelectric power generator A of the first embodiment, except for the configuration of the spring means 12.

Using the four coil springs 12c to 12f as the spring means 12 in the present embodiment stabilizes the position of the swing axis CS of the first weight member 13, and reduces movement in the right-and-left direction (i.e., swing about the Y-axis). It is thus possible to efficiently convert an external vibration to a swing of the first weight member 13, further amplify the amount of displacement of the generating device 20, and increase the amount of power generated by the piezoelectric power generator B. Note that any number of coil springs can be used in any arrangement.

(Third Embodiment)

Figure 10:
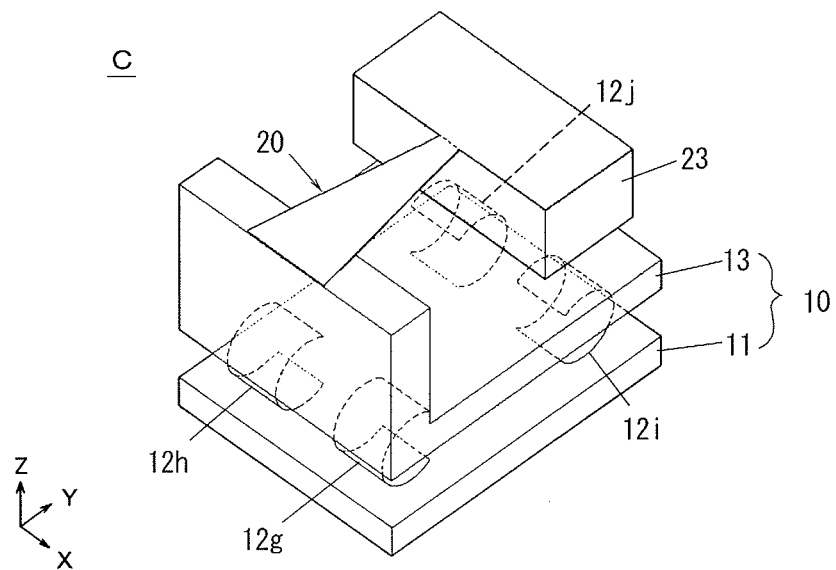
FIG. 10 is a perspective view of a third embodiment of the piezoelectric power generator according to the present invention.

FIG. 10 illustrates a third embodiment of the piezoelectric power generator according to the present invention. A piezoelectric power generator C of the present embodiment uses four U-shaped leaf springs 12g to 12j as the spring means 12. The arrangement of the leaf springs 12g to 12j is the same as the arrangement of the coil springs 12c to 12f illustrated in FIG. 9. The piezoelectric power generator C of the present embodiment is the same as the piezoelectric power generator A of the first embodiment, except for the configuration of the spring means 12. The effects of the present embodiment are the same as those of the second embodiment. Using the leaf springs, instead of the coil springs, as the spring means 12 facilitates attachment of the spring means 12 to the base member 11 and the first weight member 13. Note that the leaf springs do not necessarily need to be U-shaped, and the number of the leaf springs does not necessarily need to be four.

(Fourth Embodiment)

Figure 11:
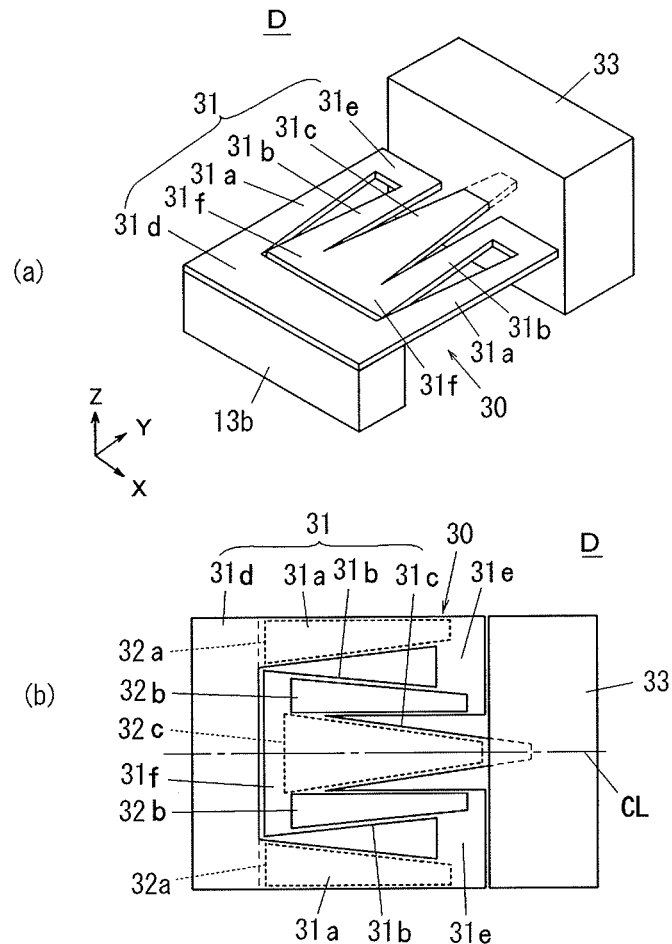
FIG. 11 provides a perspective view and a plan view of a generating device used in a fourth embodiment of the piezoelectric power generator according to the present invention.
Figure 12:
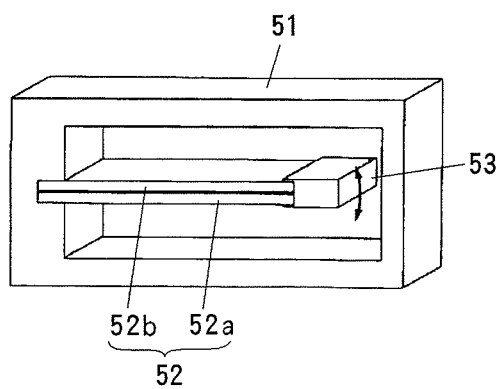
FIG. 12 is a perspective view of a piezoelectric power generator described in Patent Document 1.
Figure 13:
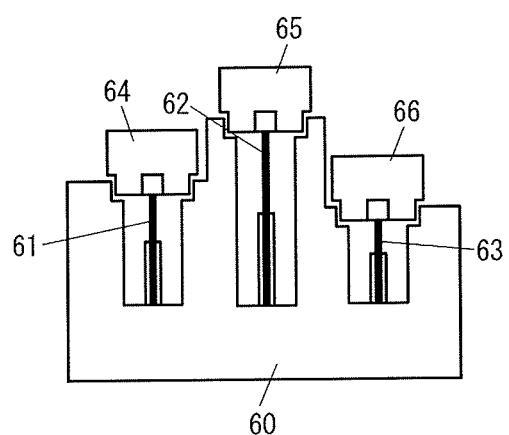
FIG. 13 is a cross-sectional view of a piezoelectric power generator described in Patent Document 2.
Figure 14:
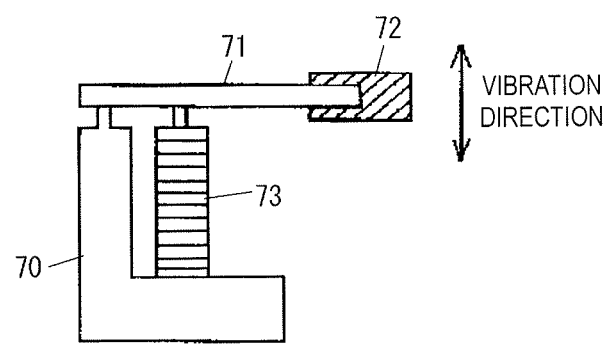
FIG. 14 is a lateral view of a piezoelectric power generator described in Patent Document 3.

FIG. 11 illustrates a generating device used in a fourth embodiment of the piezoelectric power generator according to the present invention. A piezoelectric power generator D of the present embodiment uses a generating device 30 as the generating device. The generating device 30 of the present embodiment includes a vibrating plate 31 such as a metal plate, piezoelectric elements 32a to 32c bonded to both principal surfaces of the vibrating plate 31, and a second weight member 33 for excitation. Note that the piezoelectric elements 32a to 32c are omitted in FIG. 11(a). The piezoelectric power generator D of the present embodiment is the same as the piezoelectric power generator A of the first embodiment, except for the configuration of the generating device 30.

A fixed portion 31d, which is one end of the vibrating plate 31, is secured to the upper surface of the support base portion 13b of the first weight member 13. The other end of the vibrating plate 31 is a free end, and is provided with the second weight member 33 attached thereto. The vibrating plate 31 has a U-shaped through portion between the one end and the other end thereof. The through portion has a portion located adjacent to the one end of the vibrating plate 31 and extending in the X-axis direction; and two portions located between the one end and the other end of the vibrating plate 31 and adjacent to respective end portions of the vibrating plate 31 along the longitudinal direction, the two portions extending in the Y-axis direction. The other end of the vibrating plate 31 has notches on both sides of the portion to which the second weight member 33 is attached. Specifically, the vibrating plate 31 has first to third arm portions 31a to 31c and first and second folded portions 31e and 31f. The first arm portions 31a and the second arm portions 31b are provided in pairs on both right and left sides of the third arm portion 31c. Therefore, the vibrating plate 31 is symmetric with respect to an axial line CL passing through the center of the third arm portion 31c. The first arm portions 31a are located at the respective end portions of the vibrating plate 31 along the longitudinal direction and extend in the Y-axis direction. The first arm portions 31a gradually narrow from the fixed portion 31d toward the second weight member 33. One ends of the first arm portions 31a are connected to the fixed portion 31d, whereas the other ends of the first arm portions 31a are connected via the respective first folded portions 31e to respective one ends of the second arm portions 31b. The second arm portions 31b face the respective first arm portions 31a across the through portion, and extend in the Y-axis direction. The second arm portions 31b gradually narrow from the fixed portion 31d toward the second weight member 33. One ends of the second arm portions 31b are connected via the respective first folded portions 31e to the respective other ends of the first arm portions 31a, whereas the other ends of the second arm portions 31b are connected via the respective second folded portions 31f to one end of the third arm portion 31c. The third arm portion 31c faces the second arm portions 31b across the notches, and extends in the Y-axis direction. The third arm portion 31c gradually narrows from the fixed portion 31d toward the second weight member 33. One end of the third arm portion 31c is connected via the second folded portions 31f to the other ends of the second arm portions 31b, whereas the other end of the third arm portion 31c is a free end to which the second weight member 33 is attached.

The piezoelectric elements 32a are bonded to the respective lower surfaces of the first arm portions 31a, the piezoelectric elements 32b are bonded to the respective upper surfaces of the second arm portions 31b, and the piezoelectric element 32c is bonded to the lower surface of the third arm portion 31c. The piezoelectric elements 32a to 32c are geometrically similar to the corresponding arm portions.

In the piezoelectric power generator D of the present embodiment, substantially the same amount of bending stress is generated in each arm portion, and the bending stress is substantially uniformly distributed across the length of each arm portion. Therefore, the amount of power generated by the piezoelectric power generator D is greater than that generated by any of the piezoelectric power generators A to C of the first to third embodiments, each of which includes the vibrating plate 21 formed by a single arm portion.

The piezoelectric power generator of the present invention is not limited to the embodiments described above, and various changes may be made thereto. The spring means is not limited to coil springs or leaf springs, and the number of the spring means is not limited to two or four. Although the first weight member is L-shaped in lateral view in the embodiments described above, the first weight member may be of any shape. The fixed position of the generating device is not limited to one end portion as in the embodiments described above. To prevent the first weight member of the resonator from laterally moving (i.e., swinging about the Y-axis) in response to an external vibration applied thereto, a guide means may be added which guides the first weight member and allows it to move only in the up-and-down direction. Examples of the guide means include a wall or a post that is secured to or integrally formed with the base member 11, and slidably guides both sides of the first weight member 13.

REFERENCE SIGNS LIST

A to D: piezoelectric power generator
10: resonator
11: base member
12: spring means
12a, 12b: coil spring
13: first weight member
20: generating device
21: vibrating plate
22: piezoelectric element
23: second weight member
25: rectifier and electric storage circuit
30: generating device
31: vibrating plate
31a to 31c: first to third arm portions
31e, 31f: first and second folded portions
32a to 32c: piezoelectric element
33: second weight member

The invention claimed is:

1. A piezoelectric power generator comprising:
a resonator including a base, a first weight member and a biasing element coupled between the base and the first weight member;
a second weight member;
a generating device including a vibrating plate having a first end coupled to the first weight member and a second end coupled to the second weight member; and
a piezoelectric element coupled to the vibrating plate, wherein the generating device is configured to bend and vibrate in a vertical direction, and wherein the first weight member comprises a flat support plate portion and a support base portion extending perpendicularly form the flat support plate portion.

2. The piezoelectric power generator according to claim 1, wherein the first weight member swings at a predetermined frequency about an axis perpendicular to a bending vibration plane of the generating device.

3. The piezoelectric power generator according to claim 1, wherein the first weight member swings in response to an external vibration applied to the base, and the generating device bends and vibrates in synchronization with the first weight member.

4. The piezoelectric power generator according to claim 1, wherein the first weight member has a first mass greater than a second mass of the second weight member.

5. The piezoelectric power generator according to claim 1, wherein the first weight member is configured to swing on a swing axis that is closer to the second end of the generating device than a center of gravity of the first weight member.

6. The piezoelectric power generator according to claim 1, wherein the resonator comprises a first resonance frequency f1 that is lower than a second resonance frequency fa of the generating device.

7. The piezoelectric power generator according to claim 6, wherein a ratio of the resonance frequency f1 of the resonator to the resonance frequency fa of the generating device satisfies the equation $0.4 \leq f1/fa \leq 0.95$.

8. The piezoelectric power generator according to Claim 1 wherein the biasing element comprises a plurality of coil springs.

9. The piezoelectric power generator according to claim 1, wherein the biasing element comprise two coil springs adjacent each other and disposed directly below the generating device.

10. The piezoelectric power generator according to claim 1, wherein the biasing element comprises a plurality of leaf springs.

11. The piezoelectric power generator according to Claim 1, wherein the first end of the vibrating plate is coupled to a top surface of the support base portion of the first weight member.

12. The piezoelectric power generator according to claim 1, wherein the generating device decreases in width from the first end to the second end.

13. The piezoelectric power generator according to claim 1, wherein the generating device has a shape of an isosceles triangle.

14. The piezoelectric power generator according to claim 1, wherein the piezoelectric element is a piezoelectric ceramic that is bonded to the vibrating plate.

15. The piezoelectric power generator according to claim 1, wherein the second weight member is coupled to a lower surface of the vibrating plate that faces the resonator.

16. The piezoelectric power generator according to claim 1, wherein the generating device comprises:

a plurality of arm portions juxtaposed to one another, a plurality of folding portions that each connect at least two of the plurality of arm portions, and a plurality of piezoelectric elements bonded to the plurality of arm portions, respectively.

17. The piezoelectric power generator according to claim 16, wherein the generating device is folded back on a same plane between the first end and the second end of the vibrating plate.

18. The piezoelectric power generator according to claim 16, wherein the plurality of arm portions each comprise a tapered shape.

19. A piezoelectric power generator, comprising:

a resonator including a base, a first weight member and a biasing element coupled between the base and the first weight member;

a second weight member;

a generating device including a vibrating plate having a first end coupled to the first weight member and a second end coupled to the second weight member; and a piezoelectric element couple to the vibrating plate, wherein the generating device is configured to bend and vibrate in a vertical direction, and wherein the first weight member is L-shaped.

* * * * *